United States Patent Office 3,265,576
Patented August 9, 1966

3,265,576
SUBSTITUTED AMINO THIATRIAZOLES USEFUL IN COUNTERACTING HYPERTENSION
Hollis G. Schoepke and Leo R. Swett, both of Waukegan, Ill., assignors to Abbott Laboratories, Chicago, Ill., a corporation of Illinois
No Drawing. Filed Aug. 19, 1965, Ser. No. 481,073
11 Claims. (Cl. 167—65)

The present application is a continuation-in-part of Serial No. 323,569, filed November 14, 1963, and now abandoned.

This invention is concerned with a method of counteracting hypertension by the administration to warm-blooded animals of a compound of the formula

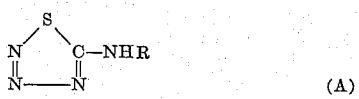

(A)

wherein R is phenyl, 1-naphthyl, benzyl, mono- or diloweralkylphenyl, mono- or diloweralkoxyphenyl and mono- or dihalophenyl. The terms "loweralkyl" and "loweralkoxy" as employed herein include the alkyl and alkoxy radicals containing from 1 to 4 carbon atoms, inclusive.

The 5-(substituted)amino-1,2,3,4-thiatriazoles employed in the method of the present invention are known compounds or can be readily prepared by methods which are known. See, for example, Canadian Journal of Chemistry, 35, 832 (1957) and 37, 101 (1959).

It has now been discovered that when compounds of the Formula A are formulated with solid or liquid pharmaceutically acceptable carriers and administered orally, rectally or parenterally to hypertensive animals, an immediate and prolonged drop in blood pressure results. When employed intravenously, the preferred dosage range is 1 to 10 mg./kg. daily. Orally or rectally, the dosage will vary from 10 to 60 mg./kg. daily. Typical formulations and the results obtained by their use are clearly set forth in the examples which follow.

Example 1

Mix 60 grams of the thiatriazole wherein R of Formula A is p-methoxyphenyl with 260.72 grams of milk sugar and pass the mixture through a 30 mesh screen. Dissolve 4.80 grams of acacia in 25 ml. of water and add the resulting solution to the mixture first prepared. Granulate the wet mass through a 6 mesh screen, dry the granulation at 50° C. overnight and grind the dried granulation to 20 mesh. Add 38.4 grams of corn starch, 10.52 grams of talc and 6.56 grams of stearic acid to the dried granulation, pass through a 40 mesh screen, mix thoroughly and compress into tablets containing 25 mg. each of the thiatriazole compound.

Example 2

Mix 25 grams of the thiatriazole wherein R of Formula A is p-chlorophenyl with 273.5 grams of lactose and blend with 1.5 grams of magnesium stearate. Fill hard gelatin capsules with 300 mg. each of the blended mixture to produce capsules containing 25 mg. of the thiatriazole compound.

Example 3

Dissolve 10.95 grams of the thiatriazole wherein R of Formula A is phenyl and 6 grams of mono-potassium phosphate in 800 ml. of sterile water, adjust the pH of the aqueous solution to 9 and filter. Then add enough sterile water to make one liter of solution. Aseptically fill one ml. portions of the solution into 2 ml. vials and lyophilize so that each vial will contain 10 mg. of the thiatriazole compound. Stopper the vials with rubber plugs and seal.

Example 4

Several cats were anesthetized with pentobarbital and their blood pressure was recorded. The cats were then divided into groups and various dosages of different substituted aminothiatriazoles dissolved in alkaline, saline solution were injected into the femoral vein of the cats in each group. The compounds and dosages employed and their effect on the blood pressure are shown in the table below.

| Compound Employed R of Formula A= | Dosage, mg./kg. | Drop in Blood Pressure in mm. Hg | Duration in Minutes |
|---|---|---|---|
| Phenyl | 2.0 | 54 | 48 |
| p-Methoxyphenyl | 2.0 | 67 | 57 |
| p-Chlorophenyl | 5.0 | 88 | 17 |
| p-Methylphenyl | 2.0 | 110 | 13 |
| p-Fluorophenyl | 2.0 | 79 | 90 |
| 1-naphthyl | 2.0 | 40 | 120 |

Example 5

Twenty grams (0.1 mole) of 4-α-naphthylthiosemicarbazide (M.P.=138° C.) was suspended in 800 ml. of 10% aqueous hydrochloric acid and a solution of 6.9 grams (0.1 mole) of sodium nitrite was added dropwise with stirring at a temperature of 5°–10° C. When the addition was complete, stirring was continued for 3 hours. The solid 5-α-naphthylaminothiatriazole which formed was removed by filtration, washed with cold water and recrystallized from an aqueous acetone mixture. The melting point was 136° C. with decomposition. Identity was further established by elemental analysis.

Example 6

A group of dogs with artificially induced neurogenic hypertension and another group of dogs with artificially induced renal hypertension were orally administered various dosages of 5-anilino-1,2,3,4-thiatriazole in capsule form and the subsequent drop in blood pressure was recorded. In the neurogenic dogs, it was found that the minimal effective dose was 15 mg./kg. whereas a dose of 60 mg./kg. reduced the mean arterial blood pressure from 210 mm. Hg to 135 mm. Hg which was sustained from 7 to 24 hours. The minimal effective dose in the renal hypertensive dogs was 2 mg./kg. and at 60 mg./kg. the mean blood pressure was reduced from 185 mm. Hg to 145 mm. Hg for a period of from 7 to 24 hours.

Similar results are obtained when intravenous doses of from 1 to 10 mg./kg. or oral doses of from 10 to 60 mg./kg. of other thiatriazoles are administered to hypertensive, warm-blooded animals. Illustrative of such compounds are those in which R of Formula A is 2-ethylphenyl, 4-isopropylphenyl, 2,4-di-n-butylphenyl, 3,5-dimethylphenyl, 2-methylphenyl, benzyl, 1-naphthyl, 2-methoxyphenyl, 4-butoxyphenyl, 2,4-diethylphenyl, 2,6-di-n-propylphenyl, 2-bromophenyl, 4-iodophenyl, 2,4-difluorophenyl, 2,4-diethoxyphenyl, 2,5-diisopropoxyphenyl and 3,5-dichlorophenyl.

Although a thiatriazole compound of the type shown in Formula A is actually employed in the present method, it is believed that these compounds decompose in the body to form products the structures of which are not yet known but which may be the active promoters of the demonstrated effect on the lowering of blood pressure. Accordingly, all such decomposition products of the thiatriazoles actually used herein are considered to be within the scope of the present invention.

Others may practice the invention in any of the numerous ways which will be suggested to one skilled in the art by the present disclosure. All such practice of the

We claim:
1. The method of lowering blood pressure in a warm-blooded animal which comprises administering to that animal a small but effective amount of a compound of the formula

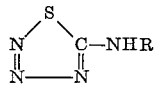

wherein R is selected from the group consisting of phenyl, 1-naphthyl, benzyl, monoloweralkylphenyl, diloweralkylphenyl, monoloweralkoxyphenyl, diloweralkoxyphenyl, monohalophenyl and dihalophenyl, admixed with a pharmaceutically acceptable carrier.

2. A method claimed in claim 1 in which R of the compound employed is phenyl.

3. The method claimed in claim 1 in which R of the compound employed is benzyl.

4. The method claimed in 1 in which R of the compound employed is p-methoxyphenyl.

5. The method claimed in claim 1 in which R of the compound employed is p-chlorophenyl.

6. The method claimed in claim 1 in which R of the compound employed is p-methylphenyl.

7. The method claimed in claim 1 in which R of the compound employed is p-fluorophenyl.

8. The method claimed in claim 1 in which R of the compound employed is 1-naphthyl.

9. The method claimed in claim 1 in which the composition is administered intravenously.

10. The method claimed in claim 1 in which the composition is administered orally.

11. The method of lowering blood pressure in a warm-blooded animal which comprises orally administering daily to said animal in tablet form from 10 to 60 mg./kg. of 5-anilino-1,2,3,4-thiatriazole admixed with a solid pharmaceutically acceptable carrier.

No references cited.

JULIAN S. LEVITT, *Primary Examiner.*

MARTIN J. COHEN, *Assistant Examiner.*